(12) United States Patent
Craig et al.

(10) Patent No.: US 9,172,459 B2
(45) Date of Patent: *Oct. 27, 2015

(54) CLEARING A FAULT CONDITION OVER A FIBRE CHANNEL PATH

(71) Applicant: International Business Machines Corporation, Armonk, NY (US)

(72) Inventors: Matthew R. Craig, Sahuarita, AZ (US); Clint A. Hardy, Tucson, AZ (US); Roger G. Hathorn, Tucson, AZ (US); Bret W. Holley, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 43 days.

This patent is subject to a terminal disclaimer.

(21) Appl. No.: 13/842,666

(22) Filed: Mar. 15, 2013

(65) Prior Publication Data

US 2013/0209086 A1    Aug. 15, 2013

Related U.S. Application Data

(63) Continuation of application No. 12/959,695, filed on Dec. 3, 2010.

(51) Int. Cl.
*H04B 10/03* (2013.01)
*H04L 12/24* (2006.01)

(52) U.S. Cl.
CPC ............ *H04B 10/03* (2013.01); *H04L 41/0663* (2013.01)

(58) Field of Classification Search
CPC ............ G06F 11/0709; G06F 11/0745; G06F 11/079; G06F 11/3409
USPC ......................................................... 714/4.1
See application file for complete search history.

(56) References Cited

U.S. PATENT DOCUMENTS

| 6,473,782 | B1 | 10/2002 | Casper et al. | |
|---|---|---|---|---|
| 2003/0081556 | A1* | 5/2003 | Woodall | 370/241 |
| 2003/0112746 | A1* | 6/2003 | Schaller et al. | 370/216 |
| 2006/0085696 | A1* | 4/2006 | Bauer et al. | 714/47 |
| 2008/0209059 | A1* | 8/2008 | Frazier et al. | 709/230 |
| 2009/0234908 | A1* | 9/2009 | Reyhner et al. | 709/203 |

* cited by examiner

*Primary Examiner* — Jigar Patel
(74) *Attorney, Agent, or Firm* — Nelson and Nelson; Daniel P. Nelson; Alexis V. Nelson (57) ABSTRACT

A method for clearing a fault condition at a target device is disclosed herein. In selected embodiments, such a method includes detecting a fault condition at a target device and receiving N instructions before the fault condition is cleared, where the N instructions are unexecutable due to the fault condition. N fault condition indicators are transmitted in response to the N instructions. Clearing of the fault condition is detected when the fault condition no longer exists. Acknowledgments corresponding to the fault condition indicators are received, where each acknowledgment indicates that one of the fault condition indicators has been received. A fault clear indicator is transmitted only after both all N fault condition indicators have been received and clearing of the fault condition has been detected. A corresponding system and computer program product are also disclosed herein.

9 Claims, 8 Drawing Sheets

CLEARING A FAULT CONDITION OVER A FIBRE CHANNEL PATH

BACKGROUND

1. Field of the Invention

This invention relates to networking technology, and more particularly to apparatus and methods for managing fault conditions in data connections.

2. Background of the Invention

The Open Systems Interconnection model (OSI model) provides a widely used model for sub-dividing a communications system into layers. A layer is a collection of conceptually similar functions that provide services to the layer above it and receives services from the layer below it. The first layer is the physical layer that translates binary data to and from electrical and optical signals. The second layer is the data link layer, which provides the functional and procedural means to transfer data between network entities and to detect and possibly correct errors that may occur in the physical layer. The third layer is the network layer, which provides the functional and procedural means of transferring variable length data sequences from a source to a destination via one or more networks. The fourth layer is the transport layer, which manages transparent transfer of data between communicating entities.

Communication between a host and storage devices in a high performance storage network is often accomplished using the Fibre Channel architecture. Fibre Channel is a networking technology primarily used to couple storage devices to a computer system, such as a server or mainframe, using fiber optic cables, though it may be used for other applications and with other cable types. The Fibre Channel architecture defines layers FC-0 through FC-2, which correspond to the physical, data link, and network layers. The Fibre Channel architecture additionally defines a common services layer (FC-3) and an application layer (FC-4) that interfaces with transport layer protocols such as SCSI, IP, and FICON.

The FICON (Fibre-Connectivity) protocol, which has been adopted as the ANSI FC-SB-4 protocol, is used to manage transport of data over a Fibre Channel cabling infrastructure. In the FICON protocol, communication occurs between entities referred to as a channel and a control unit coupled by means of a logical path. Multiple logical paths may be associated with a single port and/or physical channel connecting the channel and control unit. Each logical path may additionally have associated therewith, and communicating thereover, several devices, such as hard drives, tape drives, RAID arrays, or the like. The channel initiates input and output operations over the logical path by transmitting instructions to the control unit.

In many applications, the control unit and channel are coupled to one another across a network fabric including many network devices such as switches, routers, hubs, and the like. Many different paths may therefore exist between the control unit and channel. The network devices may have internal logic that determines the routing of data through the fabric and the order in which data is transmitted.

The lower protocol layers, e.g., the physical, data link, and network layers, and the switches and other network devices may control the flow of data across the fabric based on an "exchange" to which each unit of data belongs. An exchange includes logically associated sequences of data transmitted in both directions between the channel and control unit and is analogous to a conversation between the channel and control unit. The FICON architecture uses two Fibre Channel exchanges to establish a connection between a channel and control unit—one for communications initiated by the channel and another for communications initiated by the control unit. Instructions from the channel to a control unit may be sent on one exchange, whereas the control unit may respond over the second exchange upon executing the instruction. Inasmuch as two exchanges are present, different messages and instructions may be routed along different paths within the fabric.

Difficulty and delays arise when a fault condition is detected. Upon detecting the fault condition, the control unit will respond to all instructions from the channel by sending a fault indicator until the fault condition is cleared. Due to delays in data propagation, the channel may send several instructions before receiving the first fault indicator. Upon clearing the fault condition, the control unit sends a fault clear indicator to the channel. Upon receiving the fault indicator, the channel will refrain from sending further instructions on the logical path until a fault clear indicator is received.

Due to variation in the propagation delay of communications across the fabric, it is possible for the fault clear indicator to be received by the channel prior to one or more previously-sent fault indicators. In such instances, the channel may receive the fault clear indicator, and shortly thereafter receive a fault indicator corresponding to the same fault condition that the fault clear indicator is clearing. The channel will therefore again pause transmission of instructions until another fault clear indicator is received. Inasmuch as the fault condition has been cleared, the control unit will not send another fault clear indicator. Communication between the channel and control unit therefore ceases on the logical path.

In view of the foregoing, what is needed is a method and apparatus for effectively communicating clearing of a fault condition despite potential variation in the propagation time for fault indicators and fault clear indicators. Such a method and apparatus should advantageously do so without requiring modification of the operation of lower protocol layers.

SUMMARY

The invention has been developed in response to the present state of the art and, in particular, in response to the problems and needs in the art that have not yet been fully solved by currently available apparatus and methods. Accordingly, the invention has been developed to provide apparatus and methods for clearing a fault condition at a target device. The features and advantages of the invention will become more fully apparent from the following description and appended claims, or may be learned by practice of the invention as set forth hereinafter.

Consistent with the foregoing, a method for clearing a fault condition at a target device is disclosed herein. In one embodiment, such a method includes detecting a fault condition at a target device and receiving N instructions before the fault condition is cleared, where the N instructions are unexecutable due to the fault condition. N fault condition indicators are transmitted in response to the N instructions. Clearing of the fault condition is detected when the fault condition no longer exists. Acknowledgments corresponding to the fault condition indicators are received. Each acknowledgment indicates that one of the fault condition indicators has been received. A fault clear indicator is transmitted only after both all N fault condition indicators have been received and clearing of the fault condition has been detected.

In another aspect of the invention, transmitting the N fault condition indicators includes transmitting the N fault condition indicators to a device programmed to refrain from transmitting instructions on the data path upon receiving a fault condition indicator until a corresponding fault clear indicator is received.

In another aspect of the invention, a counter is incremented upon transmitting each of the N fault condition indicators. The counter is decremented for each acknowledgment received corresponding to a fault condition indicator. The fault clear indicator is transmitted only after both detecting the clearing of the fault condition and detecting the counter to be zero.

In yet another aspect of the invention, the fault condition is a lack of resources needed to execute the instructions. In certain embodiments, the fault condition indicator is a CUBusy message and the fault clear indicator is a CUEnd message according to the FICON protocol.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
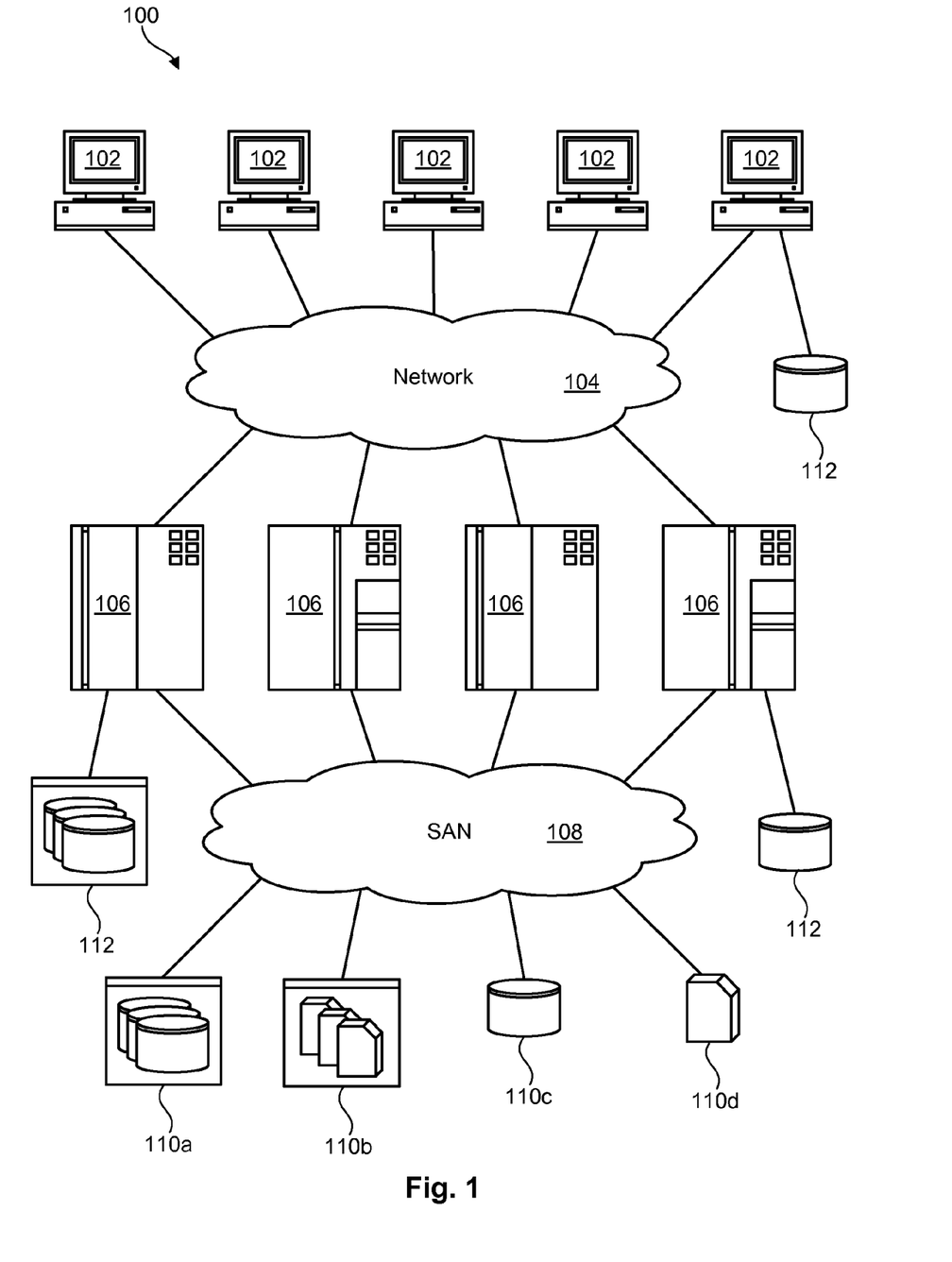
FIG. 1 is a high-level block diagram showing one embodiment of a network architecture for use with the present invention.

Referring to FIG. 1, one example of a network architecture 100 is illustrated. The network architecture 100 is presented to show one example of an environment where a system and method in accordance with the invention may be implemented. The network architecture 100 is presented only by way of example and is not intended to be limiting. Indeed, the systems and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, virtual tape libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
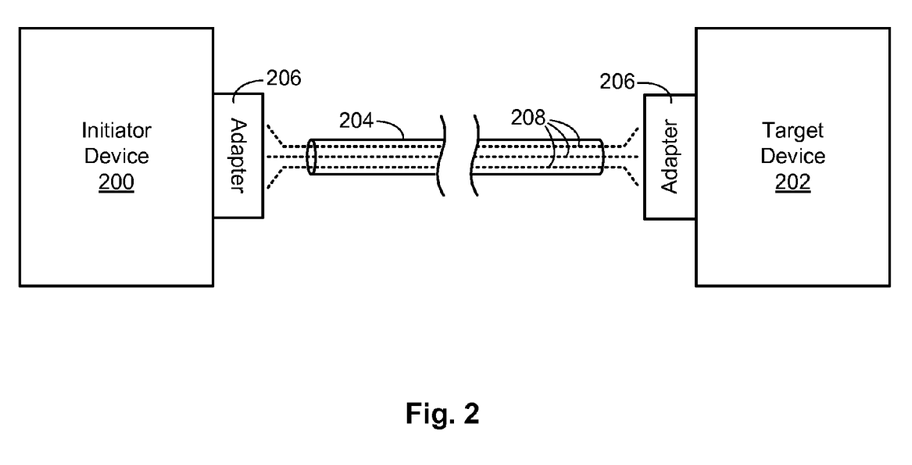
FIG. 2 is a high-level block diagram showing one embodiment of communication between an initiator device and target device.

Referring to FIG. 2, any of the computers 102, 106 and storage systems 110, 112 illustrated in FIG. 1 may operate as one or both of an initiator device 200 and target device 202 (such as is defined in the SCSI architecture). In some embodiments, the initiator device 200 operates as a "channel" and the target device 202 operates as a "control unit" according to the Fibre Connectivity (FICON) protocol. The initiator device 200 and target device 202 may communicate over a physical path 204 embodied as electrical lines, optical fibers, wireless communication links, and the like, as well as intervening network hardware (routers, switches, hubs, etc). The initiator device 200 and target device 202 may each include adapters 206 operable to convert binary data into electrical, optical, or radio frequency signals and vice versa to enable transmission over the physical path 204. The adapters 206 may additionally perform the functionality ascribed to one or more of layers one through three of the OSI model for a communication system. In certain embodiments, the initiator device 200 and target device 202 may communicate over one or more logical paths 208. One or more logical paths 208 may travel over the same physical path 204.

Figure 3:
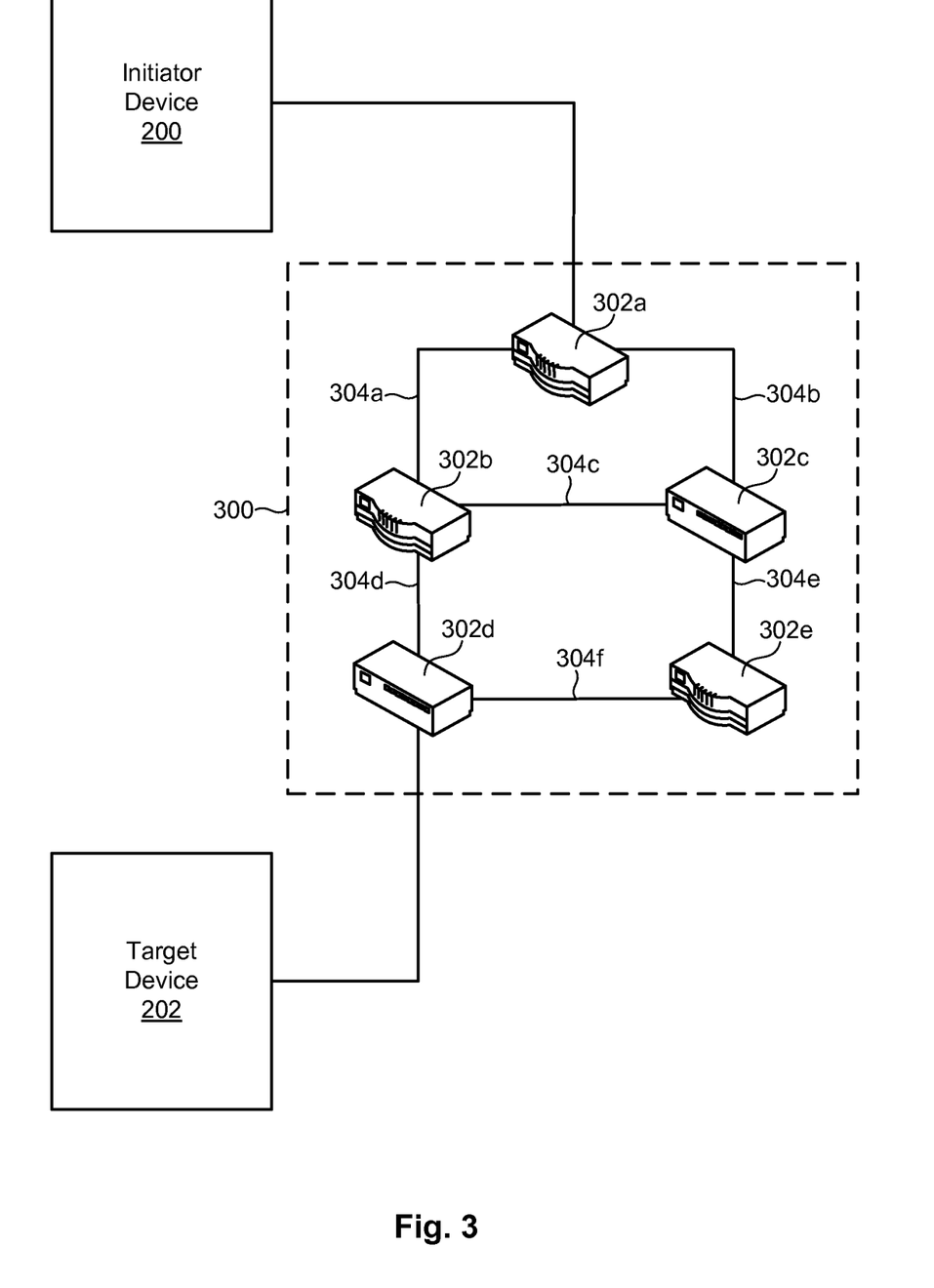
FIG. 3 is a high-level block diagram showing an initiator device and target device communicating through a network fabric.

Referring to FIG. 3, the initiator device 200 and target device 202 may be coupled to one another by means of various network topologies. In the illustrated embodiment, the initiator device 200 and target device 202 are coupled to one another by means of a network fabric 300, which includes various network devices 302a-302e for routing data across the fabric 300. The network devices 302a-302e may include devices such as routers, switches, hubs, and the like. Many network topologies define multiple paths 304a-304f between devices 302a-302e in the network. As a result, the transit time of communications sent from one device to another may vary according to the route taken.

In the Fibre Channel architecture, the order in which data is transmitted by protocol layers FC-0 through FC-2 may be exchange based. In general, an exchange is analogous to a specific conversation between entities. A communication and a response to that communication is one example of an exchange. The network fabric 300 may also perform exchange-based routing such that the path chosen for each communication is determined based on the exchange to which it belongs.

In the FICON protocol, two exchanges are generally present. One to handle communications initiated by the initiator device 200 and another to handle communications initiated by the target device 202. In general, requests to access data will originate from the initiator device 200 and be transmitted within the first exchange. The acknowledgment of receipt of the request may also be transmitted within the first exchange. Upon execution of the request, any response may be sent within a second exchange. Asynchronous communication, e.g., communications from the target device 202 not in response to instructions from the initiator device 200, may be sent within the second exchange or some other exchange. Exchanges may be defined over extended periods of time or be of short duration.

If the target device 202 detects a fault condition rendering it unable to execute an instruction from the initiator device 200, it will send a fault condition indicator in response to the instruction. For example, in the FICON protocol, a target device 202 that lacks resources to respond to an instruction will send a CUBusy message to the initiator device 200. Due to delays in data propagation, the initiator device 200 may send several instructions before receiving the first fault indicator and the target device 202 may send a fault indicator in response to each instruction. Upon clearing the fault condition, the target device 202 may send a fault clear indicator to the initiator device 200. In the FICON protocol, the target device 202 sends a CUEnd message after resources are again available to process instructions.

In some protocols, upon receiving a fault indicator, the initiator device 200 will refrain from sending further instructions on the logical path 208 over which it was received until the fault clear indicator is received. In the FICON protocol for example, upon receiving a CUBusy message, the initiator device 200 will refrain from sending data access instructions (e.g., read and write commands) on the logical path 208 on which the CUBusy message was received until a CUEnd message is received over the same logical path 208.

Due to variation in the propagation delay of communications across the fabric 300, it is possible for a fault clear indicator to be received by the initiator device 200 prior to one or more previously-sent fault indicators. In such instances, the initiator device 200 may receive the fault clear indicator, and shortly thereafter receive a fault indicator corresponding to the same fault condition that the fault clear indicator indicates no longer exists. In such a case, the initiator device 200 will refrain from sending instructions until another fault clear indicator is received. Inasmuch as the fault condition has been cleared, the target device 202 will not be prompted to send another fault clear indicator. This will cause communication between the initiator device 200 and target device 202 to undesirably cease (i.e., lock up) on the logical path 208 over which the initial fault condition indicator was sent.

Figure 4:
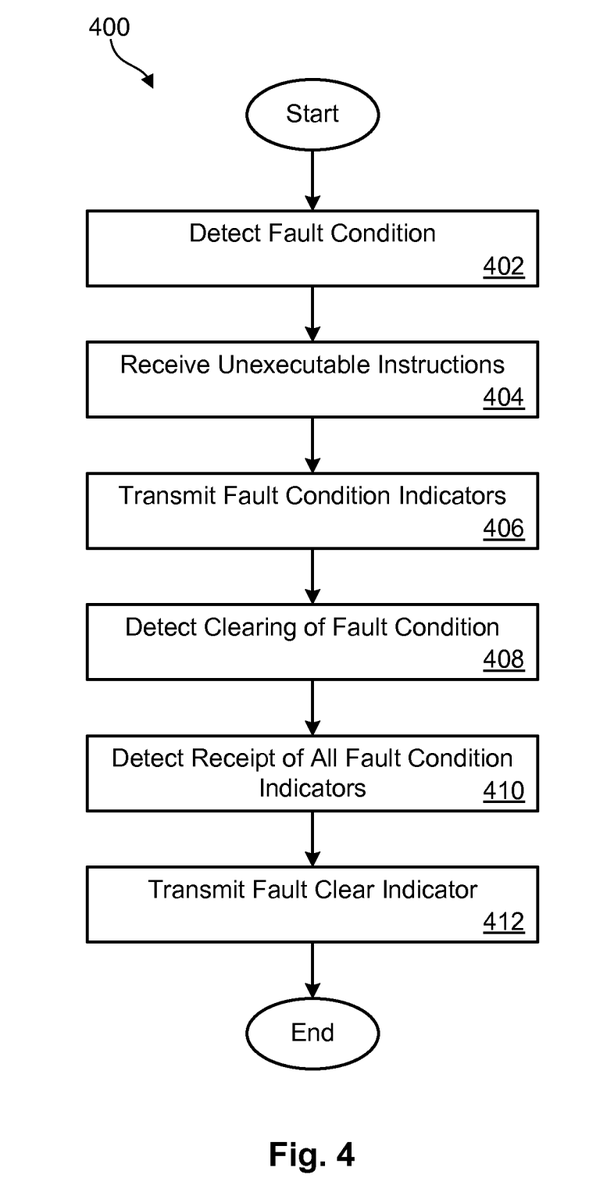
FIG. 4 is a flow diagram showing a high-level method for handling a fault condition at a target device.

Referring to FIG. 4, the illustrated method 400 may be used to prevent the locking-up of a physical or logical path due to out-of-order receipt of fault indicators and a fault clear indicator. The method 400 includes initially detecting 402 a fault condition, such as a lack of resources to process an instruction. The lack of resources may, for example, be due to a buffer that is too full to receive an instruction, an ongoing data recovery operation, insufficient memory, or the like. Instructions rendered unexecutable by the fault condition are received 404 from an initiator device 200 either just before or after detection of the fault condition. Fault condition indicators are transmitted 406 in response to some or all of the unexecutable instructions received. In certain embodiments, the fault condition indicators are CUBusy messages as defined by the FICON protocol. Clearing of the fault condition is then detected 408. This step 408 may include detecting the availability of resources such as memory, buffer space, processor time, or the like, to process instructions from the initiator device 200. At step 410, reception of all of the fault condition indicators by the initiator device 200 is detected. This step 410 may occur before, after, or simultaneously with detecting 408 the clearing of the fault condition. The fault clear indicator is then transmitted 412 to the initiator device 200 upon detecting 408, 410 both the clearing of the fault condition and the reception of all fault condition indicators by the initiator device 200.

Figure 5:
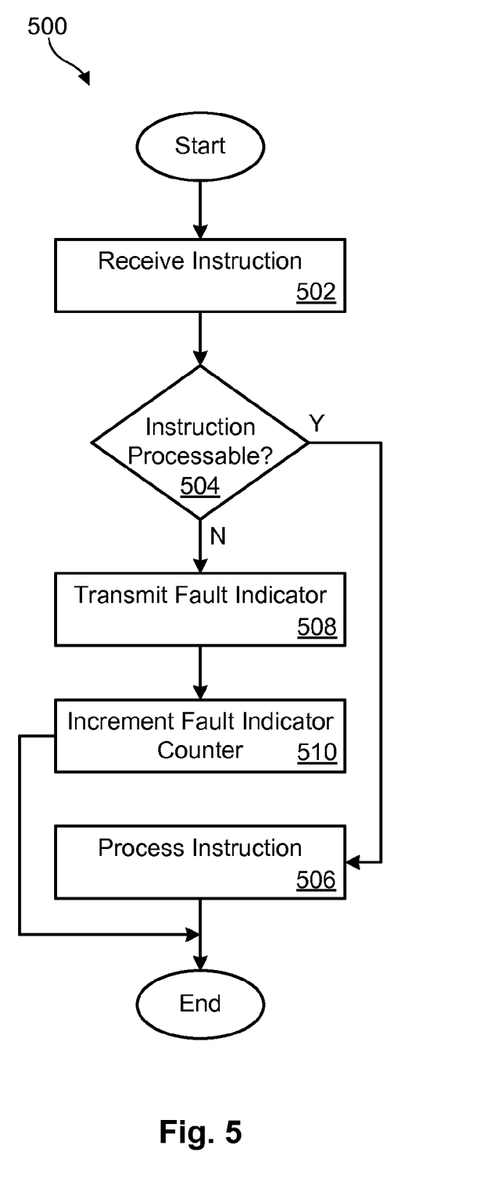
FIG. 5 is a flow diagram showing one embodiment of a method for processing instructions at a target device.
Figure 6:
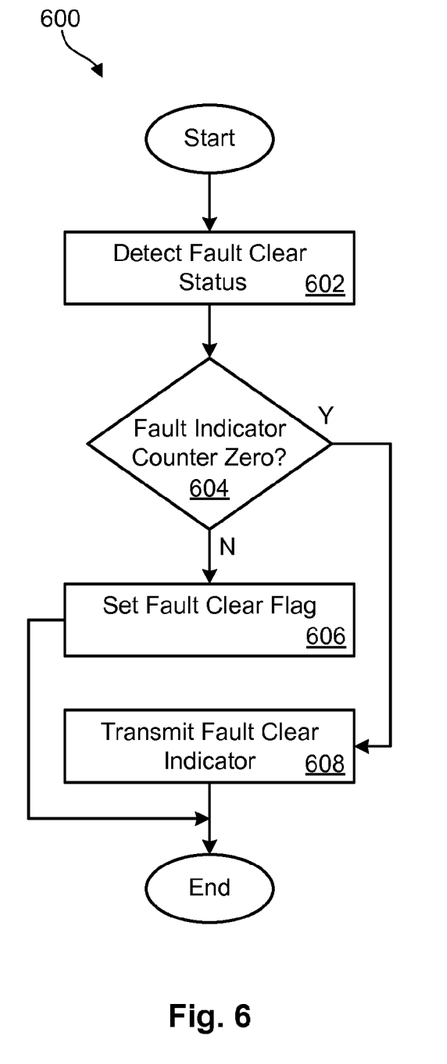
FIG. 6 is a flow diagram showing one embodiment of a method for handling clearing of a fault condition at a target device.
Figure 7:
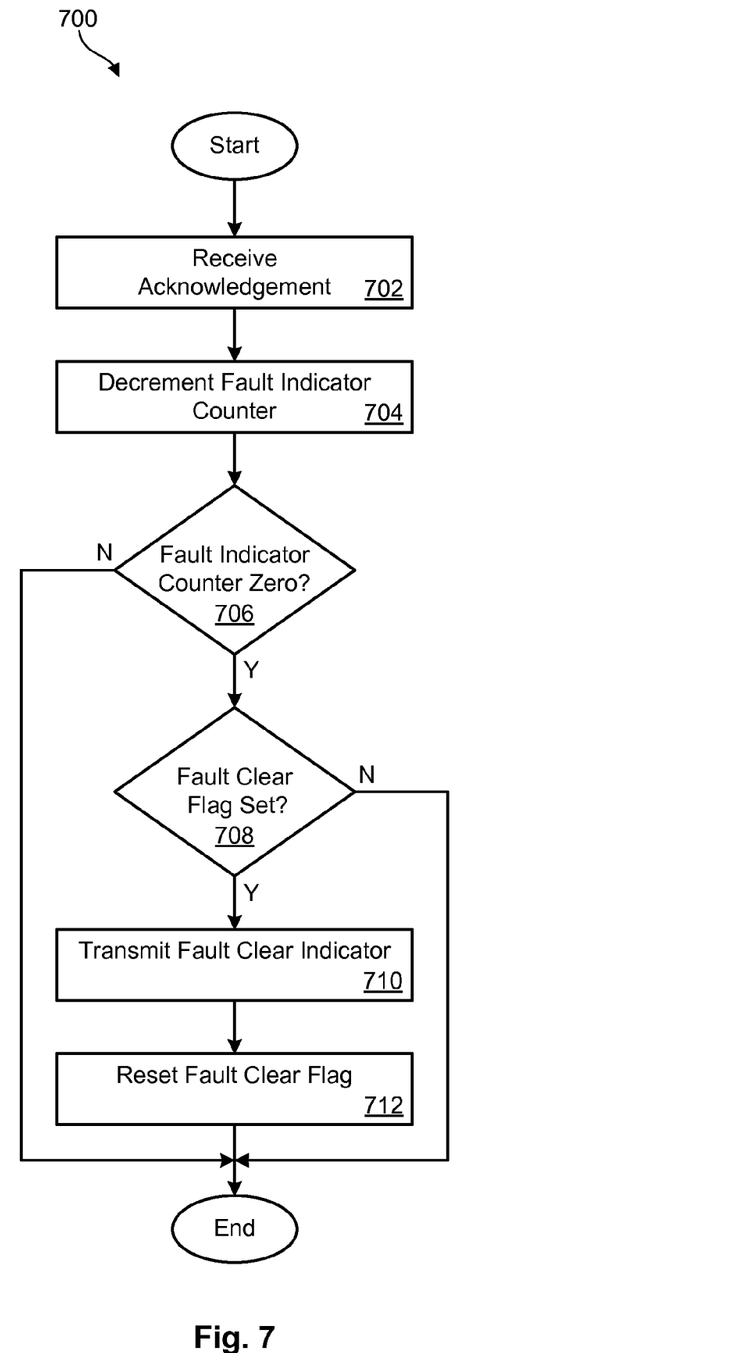
FIG. 7 is a flow diagram showing one embodiment of a method for processing acknowledgments of fault condition indicators at a target device.

The method 400 ensures that a physical or logical path does not lock up due to out-of-order receipt of fault indicators and a fault clear indicator. More specifically, the method 400 ensures that the fault clear indicator is not be received by the initiator device 200 prior to it receiving all of the fault indictors. Various methods may be used to detect 410 whether all fault condition indicators have been received by the initiator device 200 prior to sending a fault clear indicator. FIGS. 5 through 7 illustrate several such methods. The methods illustrated in FIGS. 5 through 7 may be used for virtually any type of fault condition that renders a target device 202 temporarily incapable of processing an instruction, but is then subsequently resolved.

Referring specifically to FIG. 5, one embodiment of a method 500 executable by a target device 202 when responding to instructions from an initiator device 200 is illustrated. The method 500 includes initially receiving 502 an instruction (e.g., a read or write command) from the initiator device 200 over a logical path 208. The ability of the target device 202 to process the instruction is then evaluated 504. This may include evaluating 504 whether resources are available to process the instruction, such as the availability of memory, buffer space, processor time, or the like. If sufficient resources are available to process the request, then the instruction is processed 506.

If the target device 202 is not able to process the instruction, a fault condition indicator is transmitted 508 to the initiator device 200. Where the fault condition is a lack of resources, a busy indicator may be transmitted 508 to the initiator device 200, such as a CUBusy message when using the FICON protocol. The fault condition indicator may be transmitted 508 over the same logical path 208 over which the instruction was received 502, or may otherwise indicate the logical path 208 over which the instruction was received 502. A counter may be incremented 510 for each fault condition indicator transmitted 508, either before, after, or concurrently with transmission 508 of each fault condition indicator. The counter may be associated with the same logical path 208 over which the instruction was received 502. Each logical path 208 may have a persistent counter associated therewith or a counter may be instantiated the first time a lack of resources is found upon performing the evaluation 504, and then released when the lack of resources is resolved.

Referring to FIG. 6, upon detecting the inability to process an instruction, the illustrated method 600 may be executed. As shown, the method 600 initially detects 602 clearing of a fault condition for a logical path 208. In certain embodiments, clearing of the fault condition may include detecting the availability of resources to process instructions. The status of the counter is then evaluated 604. If the counter is not zero, then a fault clear flag is set 606. The functionality of the fault clear flag is described below with respect to FIG. 7. If the counter is zero, then a fault clear indicator is transmitted 608 to the initiator device 200. The fault clear indicator may be embodied as an availability indicator communicating that the logical path 208 now has the resources needed to process further instructions. For example, the fault clear indicator may be a CUEnd message as defined in the FICON architecture. Upon receiving the fault clear indicator, the initiator device 200 may resume sending instructions on the logical path 208.

Referring to FIG. 7, in many protocols, including the FICON protocol, a recipient of a message, whether operating as an initiator device 200 or a target device 202, transmits an acknowledgment that the message was received. The illustrated method 700 may be executed upon receipt of an acknowledgement that a fault condition indicator was received. Upon receiving 702 such an acknowledgment, the counter is decremented 704. The value of the counter is then evaluated 706. If the value of the counter is not zero, then the method 700 ends. If the value of the counter is zero, then the fault clear flag is evaluated 708. If the fault clear flag has not been set, then the method 700 ends. If the fault clear flag has been set, then the fault clear indicator, such as an availability indicator or a FICON CUEnd message, is transmitted 710 to the initiator device 200. The fault clear flag is then reset 712.

The methods of FIGS. 5 through 7 ensure that a fault clear indicator, such as an availability indicator or FICON CUEnd message, is not sent until each fault condition indicator, such as a busy indicator or FICON CUBusy message, is received by the initiator device 200. The counter facilitates this by maintaining a count of all fault condition indicators sent and acknowledgments received. Only when the number of fault condition indicators sent and the number of acknowledgments received are equal, a condition existing when the counter is zero, is the fault clear indicator sent.

Figure 8:
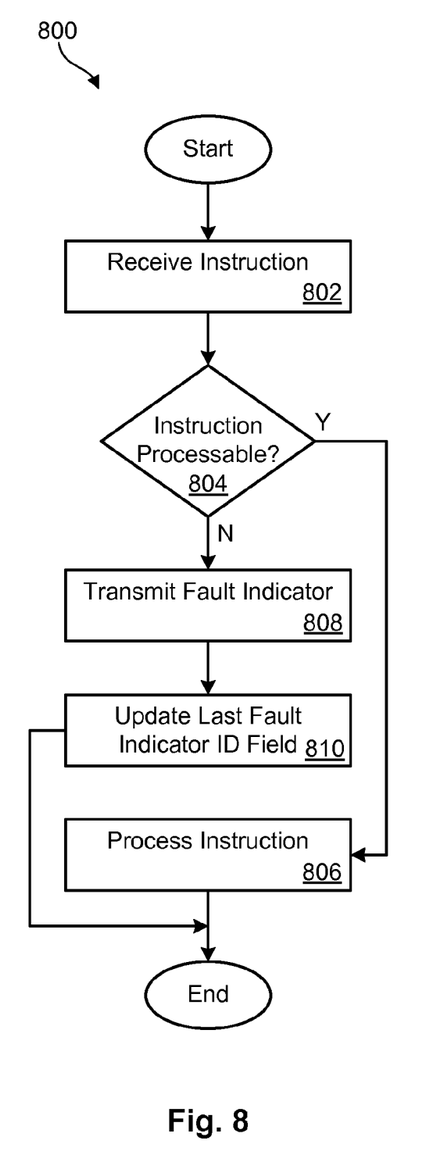
FIG. 8 is a flow diagram showing an alternative method for processing instructions at a target device.
Figure 9:
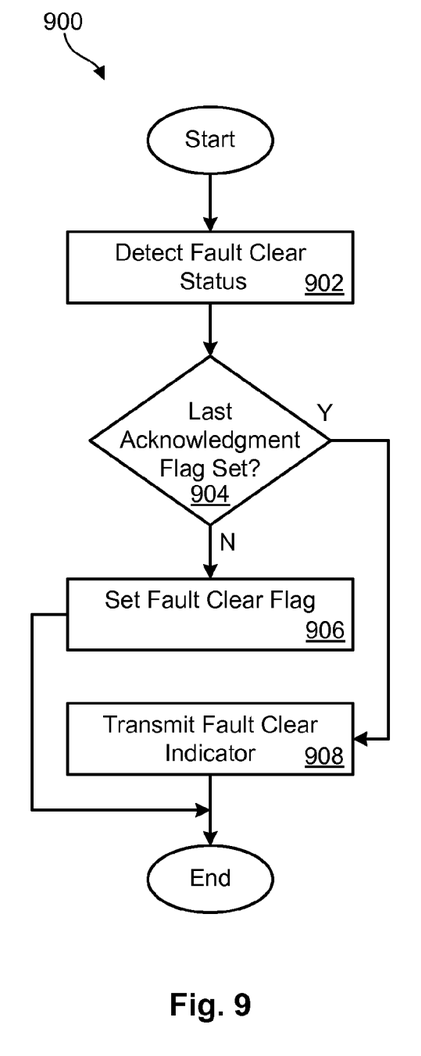
FIG. 9 is a flow diagram showing an alternative method for handling clearing of a fault condition at a target device.
Figure 10:
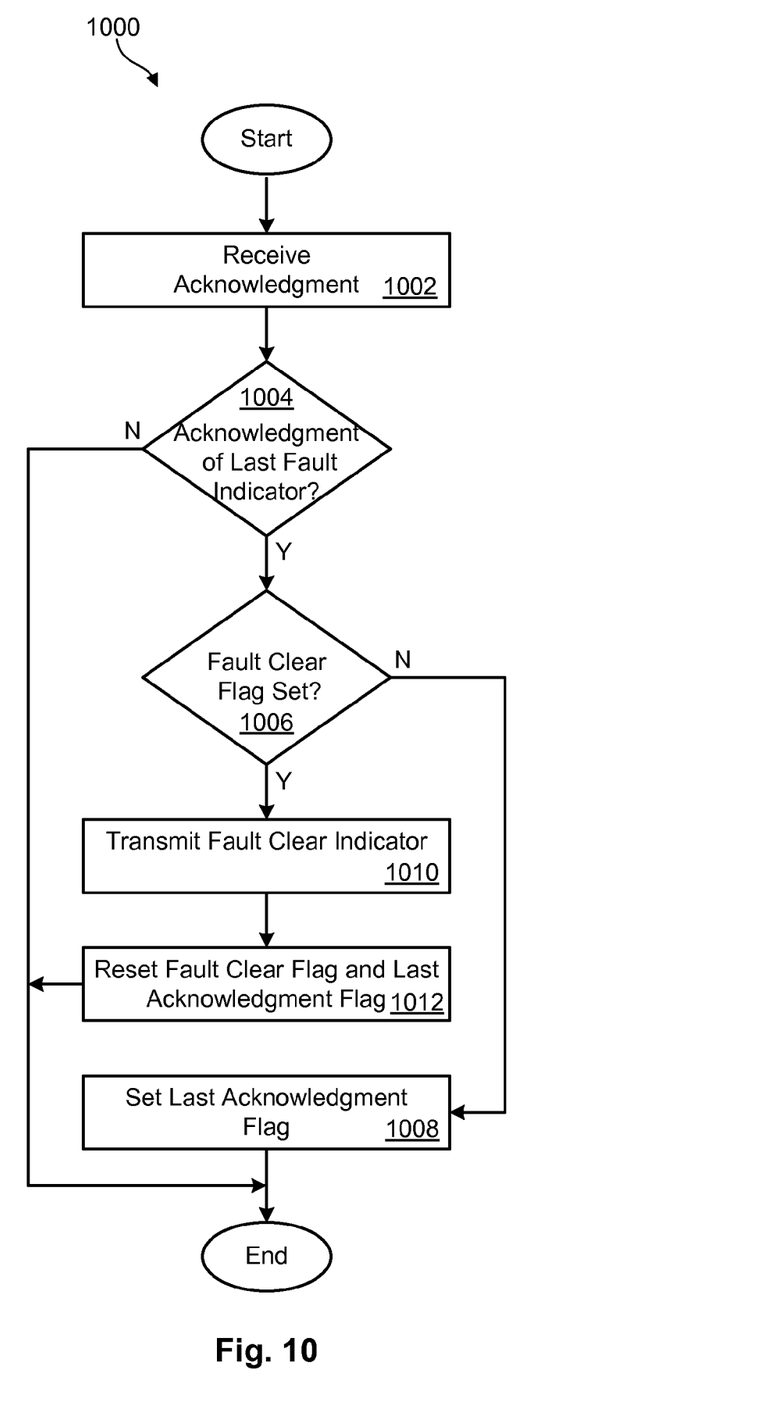
FIG. 10 is a flow diagram showing an alternative method for processing acknowledgments of fault condition indicators at a target device.

FIGS. 8 through 10 illustrate alternative embodiments of methods for ensuring that a physical or logical path does not lock up due to out-of-order receipt of fault indicators and a fault clear indicator. The methods of FIGS. 8 through 10 may be particularly useful where the fault condition indicators have a high probability of being received in the same order in which they were sent. This is likely to occur in instances where the fault condition indicators are all sent over the same exchange.

Referring specifically to FIG. 8, a method 800 may be executed by a target device 202 in response to instructions received from an initiator device 200. The method 800 initially includes receiving 802 an instruction (e.g., a read or write command) from the initiator device 200 over a logical path 208. The ability of the target device 202 to process the instruction is then evaluated 804. Evaluating 804 may include evaluating whether sufficient resources are available to process the instruction.

If sufficient resources are available to process the instruction, then the instruction is processed 806. If the target device 202 is not able to process the instruction, then a fault condition indicator is transmitted 808 to the initiator device 200, such as a busy indicator or a CUBusy message in the FICON protocol. The fault condition indicator may be transmitted 808 over the same logical path 208 over which the instruction was received 802, or may otherwise indicate the logical path 208 over which the instruction was received 802. A field containing an identifier sufficient to uniquely identify the fault condition indicator transmitted at step 808 is then updated 810.

Referring to FIG. 9, upon detecting an inability to process an instruction, the illustrated method 900 may be executed. The method 900 initially detects 902 clearing of a fault condition rendering the target device 202 unable to process instructions on a logical path 208. Where the fault condition is a lack of resources, this may include detecting 902 the availability of resources needed to process instructions. The status of a last acknowledgment flag is then evaluated 904. The purpose of the last acknowledgment flag is described below with respect to FIG. 10. If the last acknowledgment flag is not set, then a fault clear flag is set 906. If the last acknowledgment flag is set, then a fault clear indicator, such as an availability indicator or FICON CUEnd message, is transmitted 908 to the initiator device 200.

Referring to FIG. 10, the illustrated method 1000 may be executed upon receipt of an acknowledgement for a previously transmitted 808 fault condition indicator. As illustrated, the acknowledgment is received 1002 and evaluated 1004 using the identifier for the last fault condition indicator as previously discussed in association with FIG. 8. If the acknowledgment received does not correspond to the fault condition indicator indentified in the identifier field, then the method 1000 ends. If the acknowledgment does correspond to the last fault condition indicator identified in the identifier field, then the fault clear flag is evaluated 1006. If the fault clear flag is not set, the last acknowledgment flag is set 1008 and the method 1000 ends. If the fault clear flag is set, then the fault clear indicator, such as an availability indicator or FICON CUEnd message, is transmitted 1010 to the initiator device 200. The fault clear flag and last acknowledgment flag are then reset 1012.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for clearing a fault condition on a data path, the method comprising:
   detecting the fault condition;
   receiving N instructions, the N instructions being received after detecting the fault condition but prior to clearing of the fault condition, the N instructions being unexecutable due to the fault condition, wherein N is greater than one;
   transmitting N fault condition indicators in response to receiving the N instructions;
   detecting clearing of the fault condition;
   receiving acknowledgments corresponding to the fault condition indicators, each acknowledgment indicating that a corresponding fault condition indicator has been received;
   transmitting a fault clear indicator only after verifying that all N fault condition indicators have been received and the fault condition has been cleared.

2. The method of claim 1, wherein transmitting the N fault condition indicators further comprises transmitting the N fault condition indicators to a device programmed to refrain from transmitting instructions on the data path upon receiving a fault condition indicator until a corresponding fault clear indicator is received.

3. The method of claim 1, further comprising:
   incrementing a counter upon transmitting each of the N fault condition indicators;
   decrementing the counter for each acknowledgment received for the N fault condition indicators; and
   transmitting the fault clear indicator upon detecting clearing of the fault condition and that the counter is zero.

4. The method of claim 1, wherein the fault condition is a lack of resources needed to execute the N instructions.

5. The method of claim 1, wherein transmitting the N fault condition indicators and transmitting the fault clear indicator comprises transmitting the N fault condition indicators and fault clear indicator over a network fabric having multiple communication paths.

6. The method of claim 5, wherein the network fabric is configured to order transmission of data according to an exchange to which the data belongs;
   wherein transmitting the N fault condition indicators further comprises transmitting the N fault condition indicators over a first exchange; and
   wherein transmitting the fault clear indicator further comprises transmitting the fault clear indicator over a second exchange.

7. The method of claim 5, wherein the network fabric is a Fibre Channel network.

8. The method of claim 7, wherein the N fault condition indicators are CUBusy messages.

9. The method of claim 8, wherein the fault clear indicator is a CUEnd message.

* * * * *